(12) United States Patent
Fontana et al.

(10) Patent No.: US 6,871,192 B2
(45) Date of Patent: Mar. 22, 2005

(54) SYSTEM AND METHOD FOR PREVENTING UNAUTHORIZED USE OF PROTECTED SOFTWARE UTILIZING A PORTABLE SECURITY DEVICE

(75) Inventors: Joseph M. Fontana, San Jose, CA (US); Paul A. Cronce, San Jose, CA (US)

(73) Assignee: Pace Anti-Piracy, San Jose, CA (US)

( * ) Notice: Subject to any disclaimer, the term of this patent is extended or adjusted under 35 U.S.C. 154(b) by 0 days.

(21) Appl. No.: 10/028,581

(22) Filed: Dec. 20, 2001

(65) Prior Publication Data

US 2003/0120605 A1 Jun. 26, 2003

(51) Int. Cl.[7] .............................................. G06F 17/60
(52) U.S. Cl. ........................ 705/51; 705/57; 713/187; 713/190
(58) Field of Search .............................. 705/51, 57, 56, 705/59, 50–52; 713/187, 190, 200–202; 380/4, 200, 201, 203, 204, 228

(56) References Cited

U.S. PATENT DOCUMENTS

| | | | | |
|---|---|---|---|---|
| 4,817,140 A | * | 3/1989 | Chandra et al. | 380/4 |
| 5,222,133 A | * | 6/1993 | Chou et al. | 380/4 |
| 5,666,411 A | * | 9/1997 | McCarty | 705/51 |
| 5,917,908 A | * | 6/1999 | Takenaka et al. | |
| 5,995,623 A | * | 11/1999 | Kawano et al. | 380/21 |
| 6,397,333 B1 | * | 5/2002 | Sohne et al. | 713/176 |

FOREIGN PATENT DOCUMENTS

JP          63058538 A   *   3/1988

OTHER PUBLICATIONS

Software copy–protection method using serial number of disk storage; Dec. 1995;IBM Disclosure Bulletin.*

* cited by examiner

Primary Examiner—Pierre E. Elisca
(74) Attorney, Agent, or Firm—Sawyer Law Group LLP

(57) ABSTRACT

A method and system for protecting software from unauthorized use on a computer system using an external security device is disclosed. The method and system include encrypting the software to be protected using an encryption key. The use of the software on the computer system is then authorized by generating the encryption key within the security device using information supplied from the software. Once the encryption key generated by the security device is received on the computer system, the encryption key used to decrypt the encrypted software for execution on the computer system.

42 Claims, 9 Drawing Sheets

SYSTEM AND METHOD FOR PREVENTING UNAUTHORIZED USE OF PROTECTED SOFTWARE UTILIZING A PORTABLE SECURITY DEVICE

FIELD OF THE INVENTION

The present invention relates generally to the prevention of software piracy and more particularly to preventing unauthorized use of protected software by utilizing a portable personal security device.

BACKGROUND OF THE INVENTION

The problem of software piracy is well known in the computer industry. This problem results in substantial losses for software developers. Many methods have been used to try to prevent unauthorized use of software over the years, with limited success. Typically, the effort put out to break protection schemes is proportional to the value of the protected software. Thus, if a software program has high demand, such as a computer game, or has a high cost per unit, such as a professional tool sold to a small market, it is likely to be attacked by software hackers for the purpose of creating an unprotected version of the product. This unprotected version is then made available to others at low cost or free via the internet or other means.

The impact on developers is substantial. In fact, this problem is so severe in some industries, such as the music recording industry and computer games industry, that some companies are unable to guarantee the profitability of developing new software.

Some of the methods of protecting software has included an external hardware device, which is plugged into the computer. This device is interrogated by the protected software for the purpose of authorizing the use of the software. Unfortunately, it is all too easy to analyze the software and provide a software bypass around the code which requests the authorization. More complex schemes have been used to obscure the authorization process and protection scheme in an attempt to increase the difficulty of breaking the protection.

If the authorization system used by the external hardware device is simple enough and the communication packets always contain the same information, a substitute device can easily be created and provided inexpensively.

In the music industry, co-processor cards are used, along with the host processor, to provide complex effects and sound processing via plug-in co-processor software modules. Such co-processor cards can also be used for other purposes. Because the co-processor instruction sets are difficult and very complex, the number of people capable of programming the co-processor cards is limited. Also, the potential market is small. The result is that the cost of co-processor software plug-in modules is high. Unfortunately, the high cost of the modules has resulted in a high percentage of unauthorized copies of the plug-in modules being used, and insufficient development cost recovery for the developers. This has led to a reduction of new co-processor plug-in modules, and hence reduced the value of the co-processor plug-in cards.

What is needed is a more secure method of authorization which makes it difficult to bypass the authorization process or create substitute authorization devices, and which can be used either on a host processor or on an attached co-processor. The present invention addresses such a need.

SUMMARY OF THE INVENTION

The present invention provides a method and system for protecting software from unauthorized use on a computer system utilizing a security device. The method and system include encrypting the software to be protected using an encryption key. The use of the software on the computer system is then authorized by generating the encryption key within the security device using information supplied from the software. Once the encryption key generated by the security device is received on the computer system, the encryption key used to decrypt the encrypted software for execution on the computer system.

In a further aspect of the present invention, the identity of the encryption key is further maintained by first scrambling the generated encryption key with a random number received from the computer system. Thereafter, the scrambled encrypted security key is encrypted with a second encryption key that is generated by the security device from the information received from the software. When the encrypted scrambled encryption key is received on the computer system, the second encryption key provided with the software must be used to decrypt the encryption key before the encryption key can be descrambled and used to decrypt the software.

According to the method and system disclosed herein, the protected software only contains part of the information needed for decryption, and must receive the remaining information from the security device before the software can be used. Similarly, the security device cannot generate the encryption key without receiving information from the software. In the embodiment where the encryption key is randomized with information received from the software prior to being encrypted and sent to the computer system, the method and system further obfuscating the encryption key from would be hackers.

DETAILED DESCRIPTION

The present invention relates to protecting software from unauthorized use. The following description is presented to enable one of ordinary skill in the art to make and use the invention and is provided in the context of a patent application and its requirements. Various modifications to the preferred embodiments and the generic principles and features described herein will be readily apparent to those of ordinary skill in the art. Thus, the present invention is not intended to be limited to the embodiments shown but is to be accorded the widest scope consistent with the principles and features described herein.

The present invention provides a method for protecting software from unauthorized use. The present invention works in cooperation with a portable external security device that plugs into the computer system on which the software is to be run. An example of such a security device is described in U.S. patent application Ser. No. 09/503,778, entitled "Portable Authorization Device for Authorizing Use of Protected Information and Associated Method," filed on Feb. 14, 2000 by the Assignee of the present application and herein incorporated by reference. The method is not only difficult to defeat, it can be extended to protect software running on a host computer, such as a PC, Macintosh, or Unix workstation, as well as software running on plug-in co-processor boards installed in the same machines.

In one aspect of the present invention, at least two pieces of hidden keys; are used key to create additional keys for encrypting/decrypting the software. One of the keys is bundled with the encrypted software, and the other is stored in the security device to protect the hidden keys from discovery. When a user attempts to use the protected software on the computer system, the protected software passes its hidden key to the security device; and the security device uses the two hidden keys to generate the additional keys, including the encryption key. The security device then transfers the encryption key to the computer system so that the protected software may be decrypted and executed.

According to the present invention, the protected software only contains part of the information needed for decryption, and must receive the remaining information from the security device before the software can be used. Similarly, the security device can't generate the encryption key without receiving information from the software.

In a further aspect of the present invention, the security device scrambles the encryption key prior to transferring it to the software, thus providing a secure transaction between the security device and the software. The software must contain addition information to descramble the encryption key before the encryption key can be used to decrypt the software. The additional information is temporary, and is forgotten once the protected software is enabled. Thus, for each invocation of the protected software, the appropriate secure transaction must take place successfully.

Figure 1:
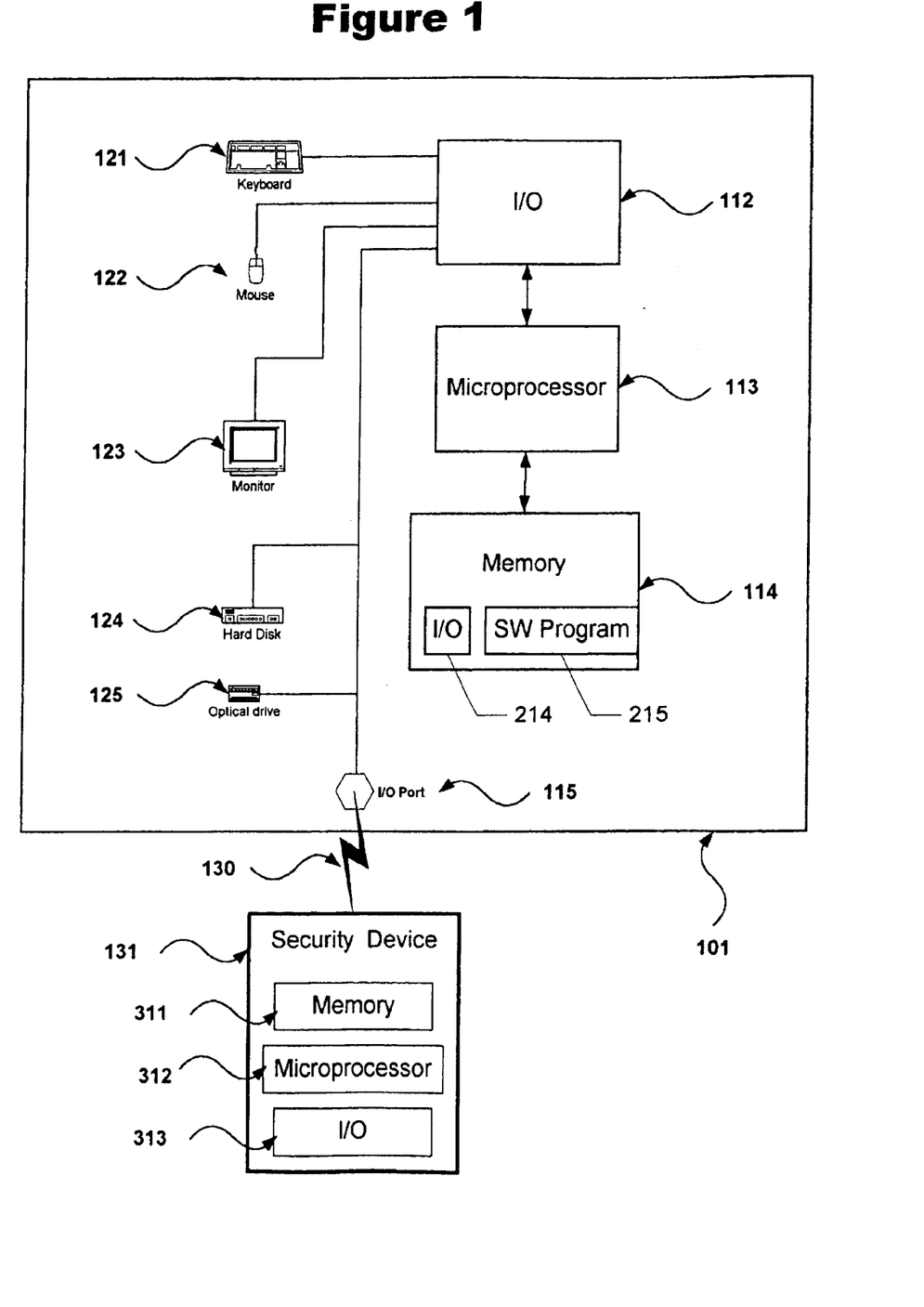
FIG. 1 is a block diagram of a computer system with an external security device connected.

Referring now to FIG. 1, a block diagram of a computer system 101 with an external security device 131 connected through an I/O port 115 is shown. Computer system 101 preferably comprises a microprocessor or CPU 113, a memory system 114, and input/output hardware 112. The input/output hardware 112 is preferably connected to a keyboard 121 for operator entry, a mouse or trackball 122 for cursor movements and control, a display monitor 123 for viewing the computer operation, a read/write non-volatile storage system such as a hard disk or flash memory 124, removable memory 125 such as a floppy disk, optical disk, or removable flash card, and an I/O port 115, such as a serial port, a USB port, an IR port, or a wireless port, to enable the user to connect an external security device 131 to the computer system such that communications 130 can occur between software running on the computer system 101 and the external security device 131. Alternate embodiments of the I/O include replacing the keyboard 121 and mouse/trackball 122 with a touch-sensitive display, using either a pen or finger as pointing and selecting device (not shown), or using a microphone for speech control (not shown). Of course, not all I/O devices shown in FIG. 1 are necessary.

The memory system 114 of computer system 101 includes an Operating System 213, the I/O Routines 214, and a software program 215 protected from unauthorized use in accordance with the present invention. The I/O Routines 214 are required for communicating over the I/O Port 115. The I/O routines 214 may be part of the Operating System 213, or may be loaded as part of the Software Program 215 in some cases. The Software Program 215, which is protected the present invention, may be loaded and installed via removable memory 125 with a CD-ROM disk, one or more floppy disks, a flash disk, or even by download via a wired or wireless modem, or a wireless or wired network connection (not shown).

Once the Software Program 215 is installed, the user can invoke the installed Software Program 215, and the Software Program 215 will be loaded into memory 114 from disk 124. The Software Program 215 typically contains code responsible for establishing communications with the external Security Device 131 via I/O Port 115, either with routines included or via standard I/O routines 214 provided with the Operating System 213. Next, the Software Program 215 will begin execution, and the operation of the present invention, if included in Software Program 215, will take place according to the description herein.

The security device 131 is preferably connected to a computer system 101 through I/O port 115. The security device 131 typically includes a microprocessor 312, a memory 311, input/output circuitry 313, and an I/O port 314. Typically, the microprocessor 312 is a security microprocessor 312, which contains the necessary circuitry (not shown) to enable data to be stored in memory 311 such that it is encrypted and thus not usable except by the microprocessor 312 itself. The memory 311 is used to store security information, such as encryption keys and authentication information. Other facilities of the microprocessor 312 enable it to establish a secure communications path 130 with the host processor. This technology is well known to those with ordinary skill in the art, and thus will not be described in detail herein. Alternate embodiments include the replacement of the microprocessor 312 with custom logic to perform the same function in hardware rather than software.

Figure 2:
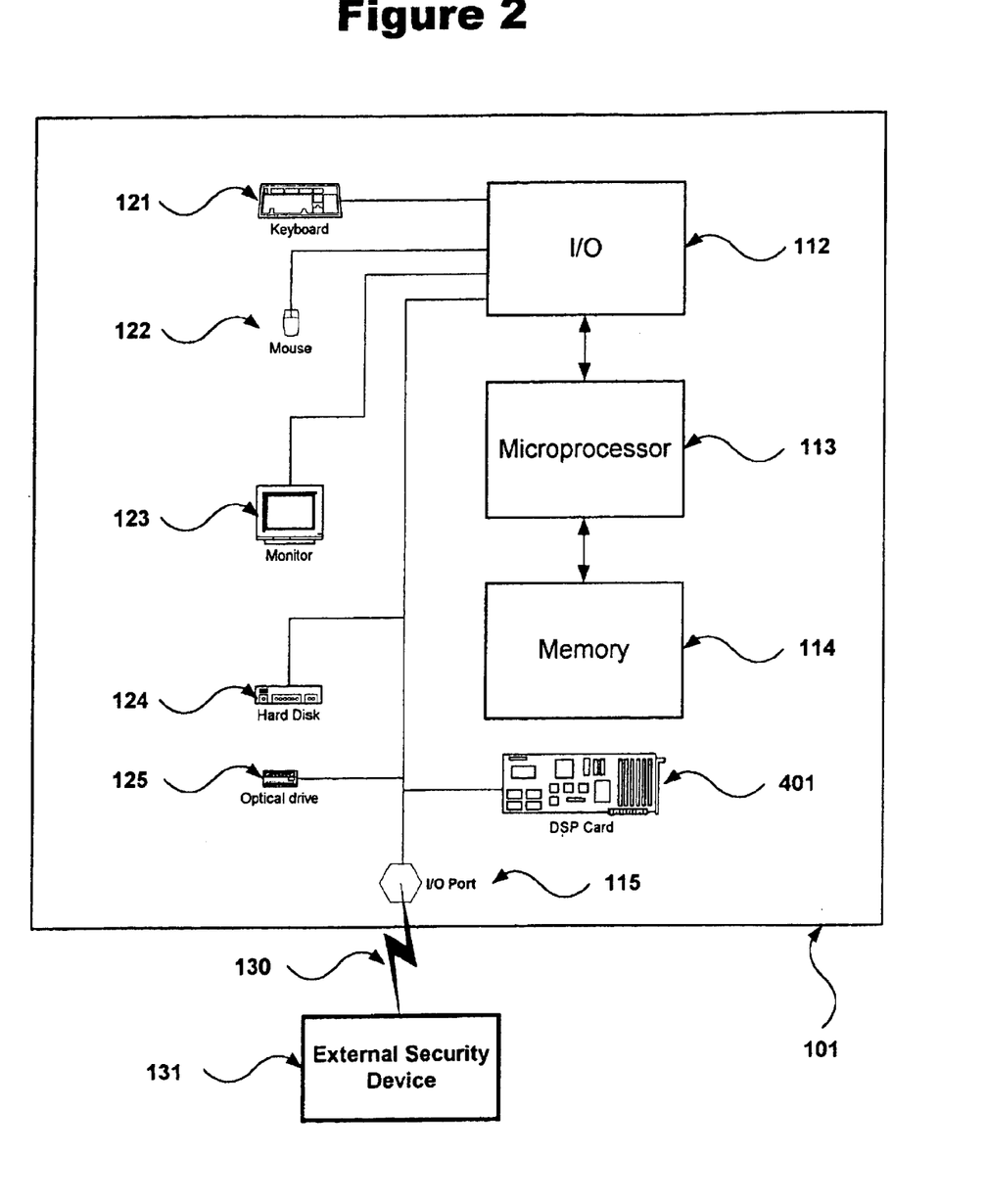
FIG. 2 is a block diagram of a computer system and external security device with a co-processor plug-in board.

Referring now to FIG. 2, a block diagram of a computer system 101 and external security device 131 with a co-processor plug-in board 401 is shown, where like components from FIG. 1 have like reference numerals. This plug-in board 401 contains one or more high performance digital signal processors (DSPs) for the purpose of accelerating the processing of data beyond that which is possible with the host processor 113 itself. Alternatively, other types of co-processors may be used, such as RISC (Reduced Instruction Set Computer), CISC (Complex Instruction Set Computer) or VLIW (Very Long Instruction Word computer). This type of plug-in board 401 is useful for many functions, including sound processing, graphics processing, and scientific processing. Additionally, this plug-in board 401 may also include its own security processor or processors (not shown) in addition to the co-processor(s). The present invention operates in all three configurations of computer system 101.

Figure 3:
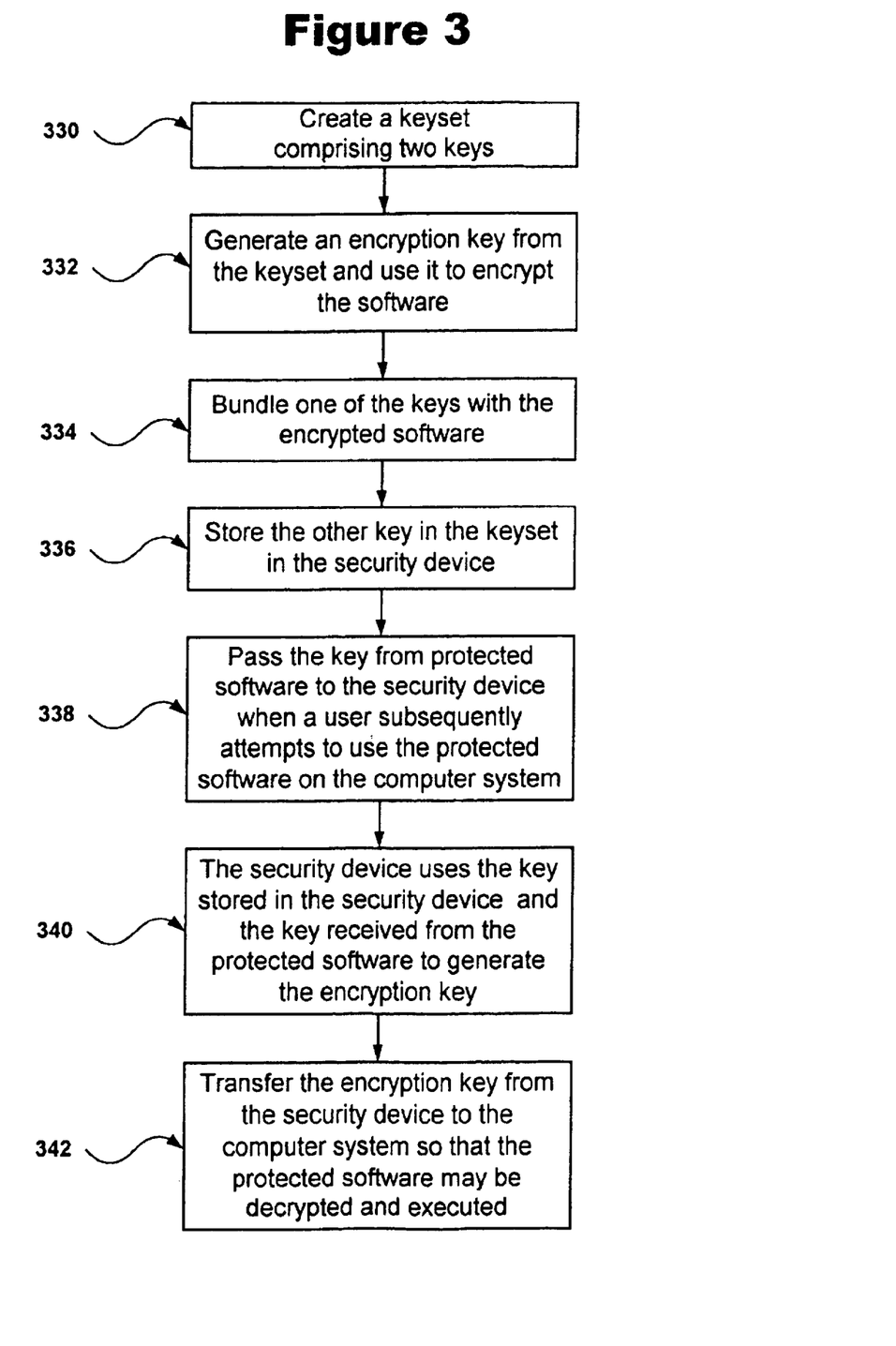
FIG. 3 is a flow chart illustrating the process of protecting software from unauthorized use on a computer system in a preferred embodiment of the present invention.

Referring now to FIG. 3, a flow chart illustrating the process of protecting software from unauthorized use on a computer system is shown in a preferred embodiment of the present invention. The process begins by creating a keyset comprising two keys in step 330. Each key in the keyset is preferable a very large number, typically 32 bytes in length (256 bits). The keys in the keyset may comprise values from various sources, as described below. The keyset is used to generate an encryption key, which is used to protect the software 215 through encryption in step 332. The encryption key is preferably in the form of a number at least 16 bytes in length. This is 128-bit encryption, and is considered sufficiently difficult to break. In the future, both the keyset and the first information may need to be larger, as computational power available for breaking encryption increases. To protect the keyset from discovery, one of the keys in the keyset is bundled with the encrypted software in step 334, and the other key in the keyset is stored in the security device 131 in step 336.

When a user subsequently attempts to use the protected software 215 on the computer system 101, the protected software 215 passes its key to the security device 131 in step 338. The security device 131 then uses the key stored in the security device 131 and the key received from the protected software 215 to generate the encryption key in step 340. After generating the encryption key, the security device 131 transfers the encryption key to the computer system 101 so that the protected software 215 may be decrypted and executed in step 342.

According to the present invention, the protected software 215 only contains part of the information needed for decryption, and must receive the remaining information from the security device 131 before the software 215 can be used. Similarly, the security device 131 cannot generate the encryption key without receiving information from the software 215. In a further embodiment, the encryption key is randomized with information received from the software 215 prior to being encrypted and sent to the computer system 101, further obfuscating the key from would be hackers.

Figure 4:
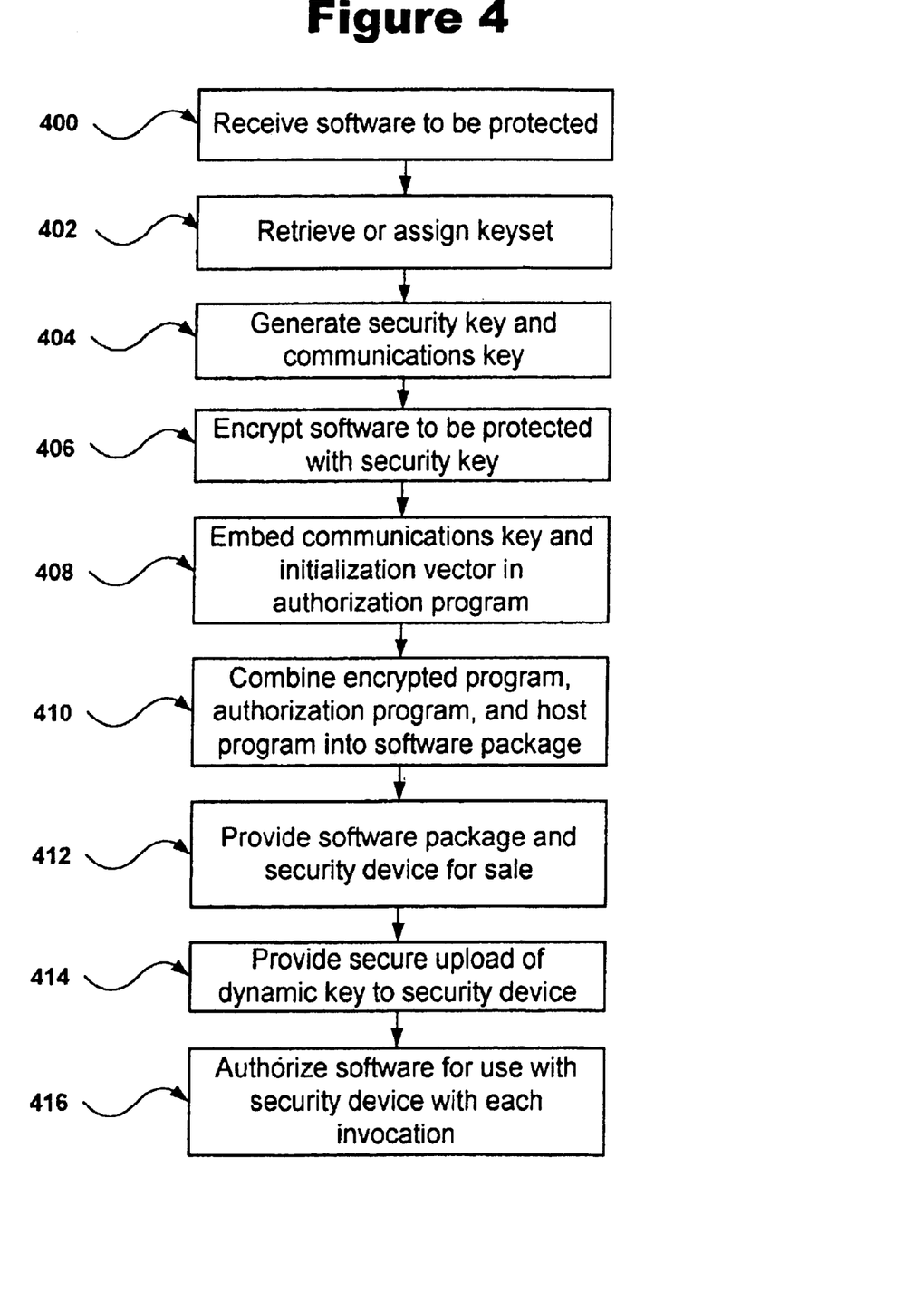
FIG. 4 is a flow chart illustrating the process of preparing a software package for use in accordance with the present invention.

Referring now to FIG. 4, a flow chart illustrating the process of preparing a software package for use in accordance with the present invention is shown. Starting with step 400, the software program to be protected is received from the software developer in step 402. The keyset is then generated and assigned to the software program in step 402.

Figure 5:
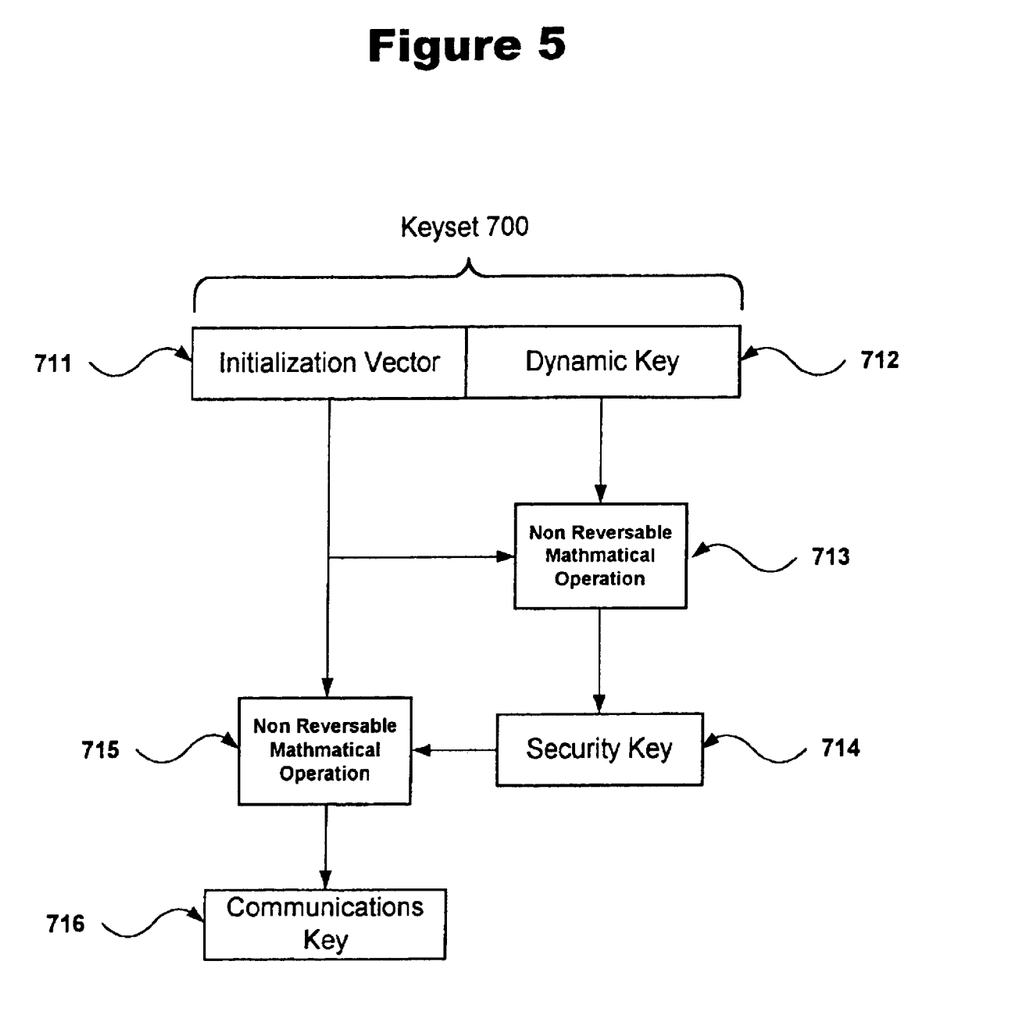
FIG. 5 is a block diagram showing a preferred embodiment of a keyset and the process of generating the keyset.

Referring now to FIG. 5, a block diagram showing a preferred embodiment of a keyset and the process of generating the keyset are shown. In the preferred embodiment, the keyset 700 comprises two components: an initialization vector 711 and a dynamic key 712. The dynamic key 712 is the underlying primary key assigned to the particular software program 215 to be protected, and typically does not change between copies of the software 215. This dynamic key 712 may be assigned by a key authority, and is kept secret from users and software developers alike. The dynamic key 712 is referred to as the 'hidden' key because it will be kept hidden in the security device 131 during the authorization process as described herein.

The other component of the keyset 700, initialization vector 711, can be assigned by the key authority or by the software developer. Alternatively, in the preferred embodiment, this value can be generated as a checksum of the protected software 215 itself. Many mathematical processes may be used to create the checksum, including a message digest algorithm, such as MD5 from RSA.

Referring again to FIG. 4, after the keyset 700 is assigned to the software 215, two encryption keys, referred to herein as a security key and a communications key are generated from the keyset 700 in step 404. According to the present invention, the security key 714 is used to both encrypt the software 215 to protect the software 215, and to then decyrpt the software 215 during authorization. However, to decrypt the software, the security device 131 must first generate the security key 714 and communications key 716 using the same process described in FIG. 5.

Referring again to FIG. 5, the security key 714 is derived from the two halves of keyset 700, the initialization vector 711 and the dynamic key 712. A non-reversible mathematical operation 713 is used for this step. Once the security key 714 is derived, the communications key 716 is calculated by performing a second non-reversible mathematical operation 715 on the security key 714 and the initialization vector 711. This same process will also be used within the security device 131 to generate the security key 714 during software authorization.

By generating the security key 714 and the communication key 716 from a non-reversible operation, it is difficult or impossible to determine the hidden dynamic key 712 even if one had access to the initialization vector 711. In the preferred embodiment, the non-reversible mathematical operation 715 has a higher level of security than the non-reversible mathematical operation 713, and therefore uses a more complex algorithm. This is because it is easiest to discover the communications key 716, since it is embedded within an authorization program (described below), preferably in a clever and difficult to extract manner. The security key 714 never appears outside of the security device 131 except in a randomized, encrypted format, and temporarily in an unencrypted format during the decryption of the protected software 215. It is immediately discarded after use. Thus, the security key 714 is much more difficult to determine electronically. By making it impossible to compute the security key 714 from the communications key 716, this protective wall is maintained, and the protected software 215 remains protected.

The non-reversible mathematical operations 713 and 715 can be fairly simple to very complex. In this embodiment, where a fairly limited processor is available within the security device 131, a simpler algorithm is preferred. In one embodiment, the non-reversible mathematical operations 713 and 715 could be a MD5 message digest algorithm. As semiconductor technology improves, and more memory and processing power becomes available in low-cost and low-power security processors, the algorithms can be more and more complex. Of course as algorithms become more complex, they also become more secure. Thus, the most complex algorithm practical within the limitations of the available technology is selected for a given implementation.

Referring again to FIG. 4, after the security key 714 the communications key 716 are generated, the software 214 is then protected by encrypting it using the security key 714 in step 406. In step 408, the communications key 716 is embedded in an authorization program. The communications key 716 should be embedded in a clever manner, to make discovery difficult. An example would be to require a mathematical or logical operation between various values from the hardware or from the authorization program 801. For example, an exclusive OR between a checksum code and another code stored with the authorization program 801 could be used.

Next, in step 410, the encrypted software, the authorization program, the initialization vector 711, and a product ID code are combined together to form a software package, depending on the hardware configuration of the computer system 101.

Figure 6:
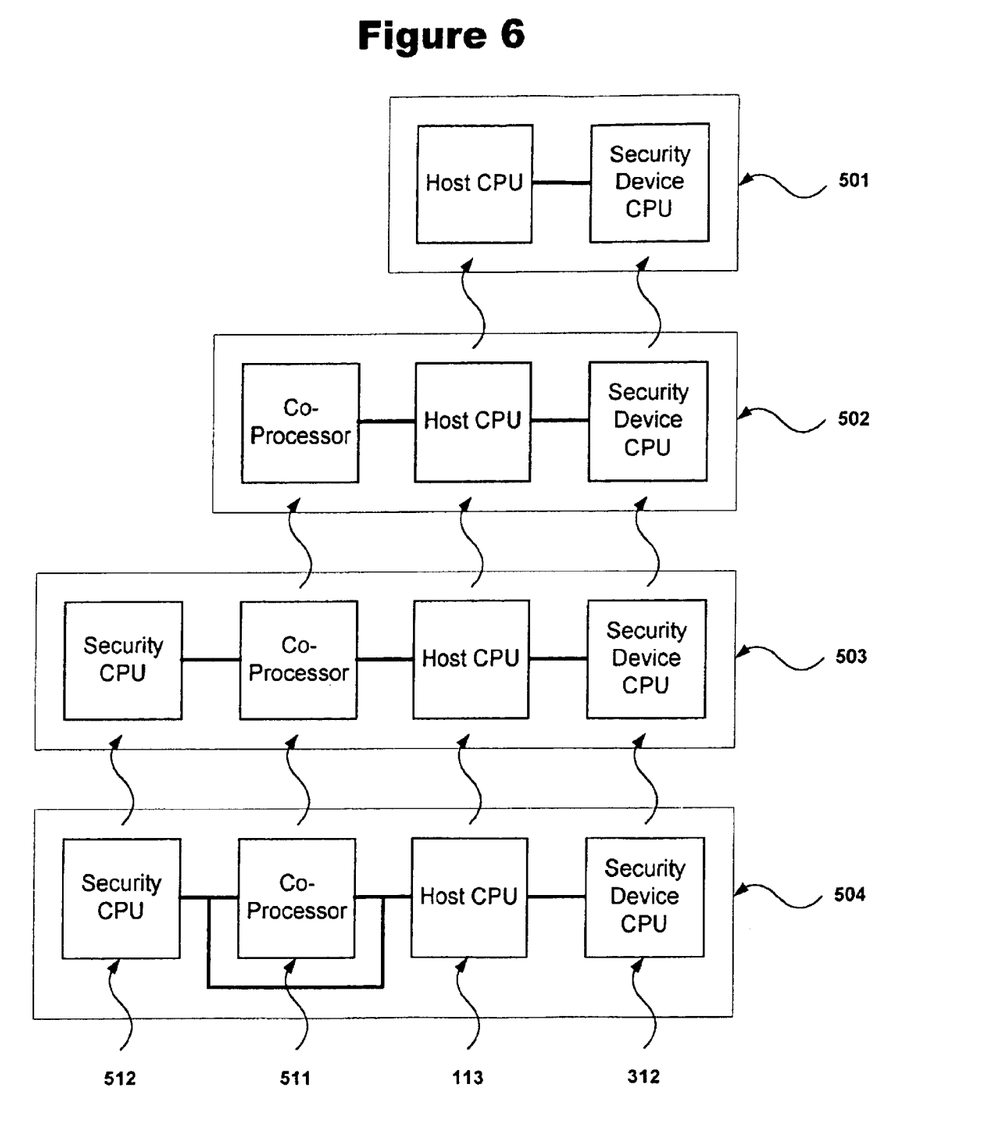
FIG. 6 are block diagrams showing components of the computer system that the software of present invention interacts with in different hardware configurations.

Referring now to FIG. 6, block diagrams showing components of the computer system that the software of present invention interacts with in different hardware configurations are shown. The basic configuration 501 includes only the host CPU 113 and the security device CPU 312, as shown in FIG. 1 and FIG. 2. In this configuration, communications occur between the two processors in order to authorize and decrypt protected software 215 to be run on CPU 113, using the method of the present invention described herein.

Figure 7A:
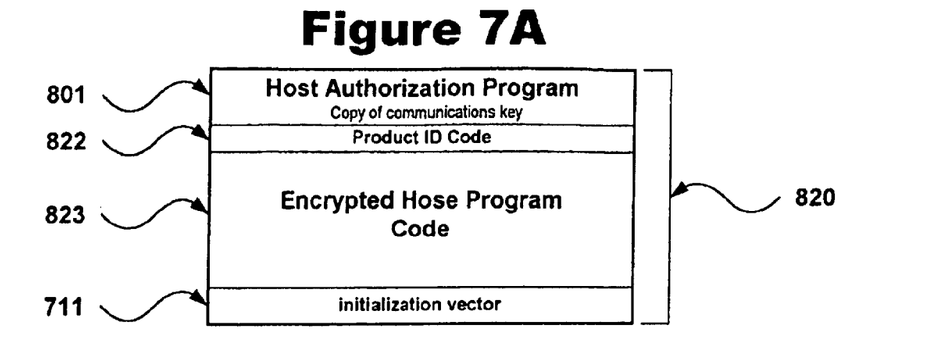
FIGS. 7A–7C are block diagrams of different embodiments of the software package created depending on the configuration of the computer system.
Figure 7B:
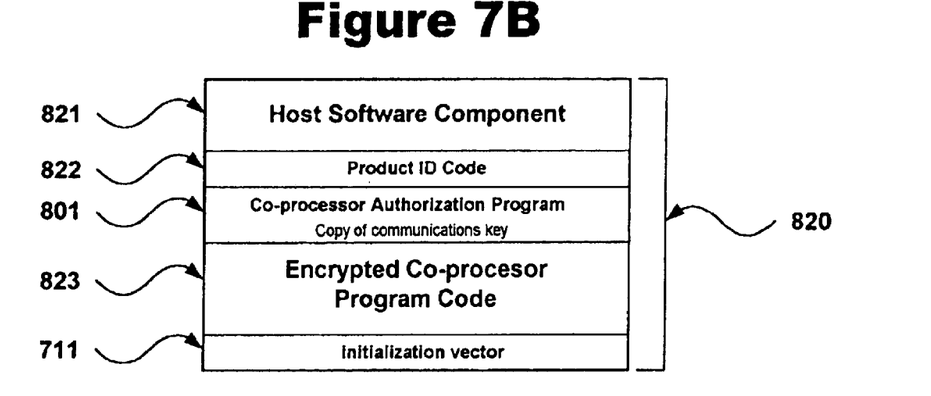
Figure 7C:
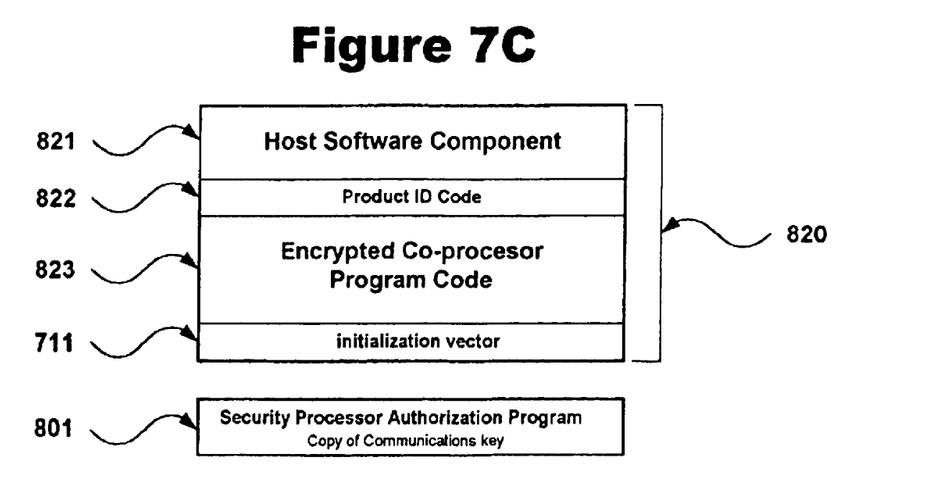

FIGS. 7A–7C are block diagrams of different embodiments of the software package 820 created depending on the configuration of the computer system 101. FIG. 7A shows the software package 820 for use with the basic configuration 501. The basic software package 820 includes the authorization program 801 in host executable form, the encrypted version of the software 823, a product ID 822, and the initialization vector 711. The initialization vector 711 can also be computed, rather than included in the package 820, as with the other cases below. The software packages 820 shown in FIGS. 7A–7C each includes the encrypted software 823, initialization vector 711, and product ID code 822 in all cases.

As stated above, the communications key 716 is preferably embedded into the software package 820. In order to adequately maintain secrecy, it is important that the communications key 716 be embedded into the software package 820 in an obscure manner. One embodiment is to include an additional data value with the software package 820 rather than the communications key 716. This additional data value, when used in conjunction with the encrypted software 823 and initialization vector 711, can be used to compute the required communications key 716. Other embodiments include reading hardware values from registers inaccessible from the system bus as part of the data to compute the communications key 716. There are many additional methods for obscuring the communications key 716 which are known to one of ordinary skill in the art, and thus will not be described herein.

Executing the authorization program 801 described in FIG. 7A on the host processor 113 in the basic configuration 501 is the least secure method. The security is lower for this configuration primarily due to the number of people familiar with the desktop microprocessor instruction sets, and who have access to debugging tools. The host CPU 113 environment is not protected, and thus all information contained within the authorization program can be extracted with enough determination.

Referring again to FIG. 6, a co-processor configuration 502 adds in the co-processor board 401, providing the co-processor CPU 511 and added security. In this configuration, the protected software runs on the co-processor 511, and communications occur between the co-processor 511 and the host CPU 113, and between host CPU 113 and the security device CPU 312. In order to authorize and decrypt the protected software 215 to be run on co-processor 511, the co-processor 511 must send communications designated for the security device CPU 312 to the host CPU 113. The host CPU 113 must then establish a secure link with security device CPU 312, send the message from the co-processor 511, receive the response, and pass it along to the co-processor 511. The co-processor then validates the response, and, if valid, decrypts the software and executes it, using the method of the present invention described herein. In a preferred embodiment, there is no direct communications between co-processor 511 and security device CPU 312.

Note that the entire process of authorization and decryption could take place on the host CPU 113 in communications with security device CPU 312, including the decryption of the co-processor software, prior to uploading to the co-processor for execution. However, this approach creates a completely decrypted copy of the co-processor software within the host computer memory 114 where it can be located and copied by hackers. Additionally, the decrypted copy of the software is transferred on the expansion bus of the computer to the plug-in board. The transfer can be monitored easily and copied. By forcing the authorization and decryption to take place within the difficult to program and debug environment of the co-processor plug-in board, where few programmers have any experience or any debugging hardware, the security of the protected software 215 is greatly enhanced.

FIG. 7B shows the software package 820 for use with the co-processor configuration 502, which is more secure than configuration 501. The co-processor software package 820 includes a co-processor authorization program 801, encrypted co-processor software 823, a host software component 821, the product ID code 822 and the initialization vector 711.

In this case, the co-processor authorization program 801 is protected in that the hardware environment of the plug-in card 401 with a specialty co-processor 511 is much more difficult to hack than a mainstream desktop host CPU 113. This protection can be enhanced more if the co-processor authorization software 801 is embedded within the co-processor boot code or operating system, resident on the plug-in card 401, rather than being loaded with the software package 820. Alternatively, the authorization program 801 can be loaded along with the encrypted co-processor software 823. The security level in this case comes from the lack of familiarity with the co-processor architecture and instruction set, as well as the lack of analysis and debugging tools by most software engineers.

The host software component 821 is responsible for handling the host component of the software function, typically including the user interaction and a control panel for the function. The host software component 821 is also responsible for communications with the security device 131 and for loading the encrypted co-processor program 823 and initialization vector 711 (if it is provided rather than being computed) into the co-processor memory. In the preferred embodiment, the product ID code 822 is provided for use in the authorization process between the host CPU 113 and security device CPU 312. Specifically, the product ID code is used to locate the dynamic key 712 within the security device 131. This enables the security device 131 to contain multiple unrelated dynamic keys 712 within its memory.

Referring again to FIG. 6, computer system configurations 503 and 504 add a security processor 512 to the co-processor plug-in board 401. In this configuration, communications occur between the security CPU 512 and either the co-processor 511 or the host CPU 113, depending on the hardware design. In order to authorize and decrypt the protected software 823 to be run on co-processor 511, the security processor 512 must send communications designated for the security device CPU 312 to the host CPU 113, either directly or indirectly through the co-processor 511. The host CPU 113 must then establish a secure link with security device CPU 312, send the message from the security processor 512, receive the response, and pass it along to the co-processor 511 or security processor 512. The security processor 512 then validates the response, and, if valid, decrypts the software, using the method of the present invention described herein.

In one embodiment, shown in configuration 503, the co-processor 511 and host CPU 113 communicate to set up and load the protected program into memory shared between co-processor 511 and security CPU 512. A request to authorize and decrypt is sent to the security CPU 512. Using the method of the present invention described herein, the security CPU 512 authorizes and decrypts the software, and enables the co-processor 511 to execute the decrypted code.

In another embodiment, configuration 504, the co-processor 511 does not operate until the security processor 512 communicates with the host CPU 113, and loads the protected software 215 into memory shared between the co-processor 511 and the security CPU 512. The security CPU 512 then authorizes and decrypts the protected software 215, using the method of the present invention described herein. Next, the security processor 512 releases the co-processor 511 to execute the decrypted code.

Other embodiments are possible, including those which do not incorporate shared memory. Likewise, multiple co-processors on a single plug-in board can be implemented with this scheme, with no security CPU 512, with a single security CPU 512, or even with multiple security CPU's 512, up to one security CPU 512 for each co-processor 511. All such variations are well known to those with ordinary sill in the art, and are within the scope of this invention.

FIG. 7C shows the software package 820 for use with the security processor configurations 503 and 504, which is more secure than configurations 502 and 501. The security processor software package 820 includes a security processor authorization program 801, encrypted co-processor software 823, a host software component 821, the product ID code 822 and the initialization vector 711.

The host software component 821 has similar responsibilities as described above for FIG. 7B, with the addition of communication with the security CPU 512. The host software component 821 is also responsible for signaling the security CPU 512 to begin authorization of the encrypted software 823, using its on-board copy of the authorization program 801, including a copy of the communications key 716. Signaling of security CPU 512 may be direct or indirect through the co-processor, depending on the configuration selected, 504 or 503.

Computer system configurations 503 and 504 are the most secure method for executing the authorization program 801. In this case, all values required for the computation—the communications key 716 as well as the authorization program 801 itself—are hidden within the security CPU 512 on-board memory, where it is not available for viewing using a hardware analyzer. The only way to break the encryption in this case is a brute force method requiring many hours of supercomputer time.

As described above, the host CPU 113 is responsible for the actual communications with the security device 131. In one embodiment, the host software must also be authorized with a secure transaction with the security device 131 before it can proceed to transfer encrypted protected co-processor software to the plug-in board 401. Once authorized, the subsequent communications described herein as part of the present invention are carried out within the established secure communication path set up by the host software authorization process.

The security device 131 may be configured to include multiple authorizations from one or more software developers. In order to select the correct authorization data from the current set of authorizations, a product ID code may be utilized. This product ID code is in effect a selector for the stored authorizations. The selector is used to locate the appropriate authorization data, which is then used to complete the authorization process.

Referring again to FIG. 4, after the software package 820 has been assembled, the software package 820 is made available for sale in step 412, typically by the software developer or his distribution company, or on a website using e-commerce. Additionally, the security device 131 is made available for sale, either as part of the software, or as a separate purchase. A separate purchase may be preferable if the software package is one of many plug-ins available, and where the security device 131 can contain multiple authorization codes.

In step 414, the dynamic key 712, purchased as part of the software package 820 is securely uploaded to the security device 131, and the security device 131 is provided to the purchaser of the software package 820. This upload can take place from an on-line web server, a plug-in smart card, a floppy disk, or other means.

Finally, in step 416, the software package 820 is loaded onto the computer system 101 for use, and the authorization program 801 is invoked, either in the host CPU 113, the c-processor 511, or the security CPU 512, depending on the configuration. When the user attempts to invoke the software, the authorization program 801 begins the process of authorizing the software in conjunction with the security device 131, which enables execution of the protected software 215.

Figure 8:
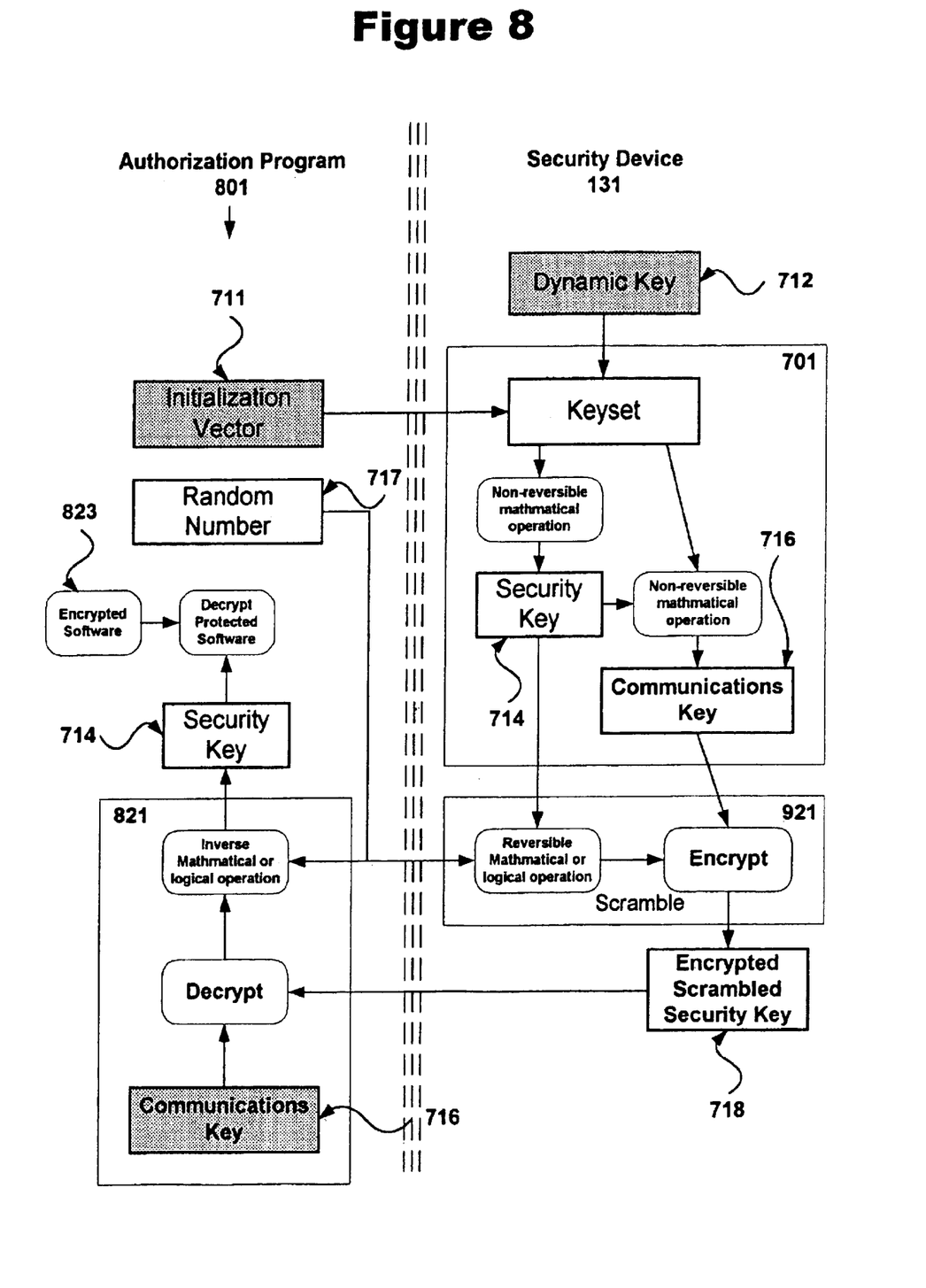
FIG. 8 is a block diagram of the authorization program and the security device during the authorization process.

Referring now to FIG. 8, a block diagram of the authorization program 801 and the security device 131 during the authorization process is shown. The gray blocks, initialization vector 711, communications key 716, and dynamic key 712 indicate what static information is contained within either the authorization program 801 or the security device 131. The white blocks represent operations or temporary, computed values, such as the blocks within function block 701, 921, and 821.

As stated above, in the preferred embodiment, the initialization vector 711 and communications key 716 are cleverly disguised in some way in the authorization program 801. However, even finding the value communications key 716 will not afford a hacker access to the security key 711 or dynamic key 712. In the most secure embodiment, configuration 503 or 504, the authorization program 801 is contained within a security CPU 512 along with the communications key 716. The initialization vector 711 is either extracted from the software package 820 or is computed from the software package 820 as described above.

Figure 9:
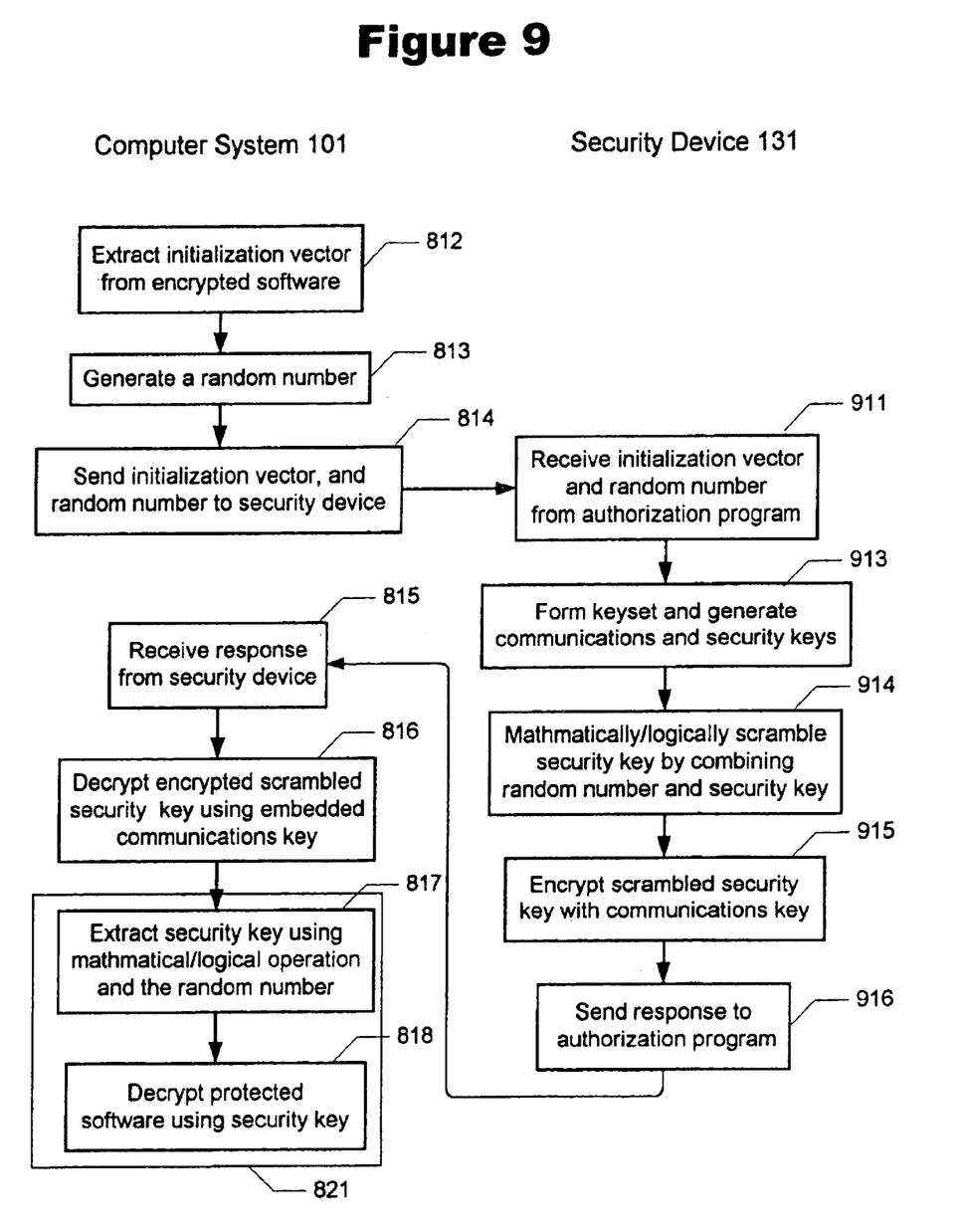
FIG. 9 is a flow chart illustrating the authentication process that takes place between the authentication program and the security device during the authorization process.

FIG. 9 is a flow chart illustrating the authentication process that takes place between the authentication program 801 and the security device 131 in which the authentication program 801 retrieves from the security device 131 the information required to decrypt and execute the protected software 215.

Referring to both FIGS. 8 and 9, the process begins with step 812, where the initialization vector 711 is extracted from the software package 820. This step could include simply locating the initialization vector 711 within the software package 820, or it could require the computation of a value based on the binary data of the encrypted software 823. For example, the value could be the checksum of the unencrypted software combined in some way with a checksum of the authorization software 801. Note that the value cannot be derived from any computations based on the encrypted software 823, since encryption cannot occur until after the assignment of the initialization vector 711.

According to the present invention, a random number 717 is generated in step 813 and is transmitted to the security device CPU 312 along with the initialization vector 711 in step 814 as one or more packets. The present invention uses the random number 717 to provide another level of security in hiding the security key 714 generated by the security device 131, as explained below. It is important for security reasons that the random number generation process be well designed. Otherwise, the randomness of the number may be insufficient to provide the desired level of security.

Referring again to FIG. 6, the transmission of the packet can be directly via a software driver, in the case of configuration 501. If configuration 502 is used, the transmission is a two-step process: first, from co-processor 511 to host processor 113, and second, from host processor 113 to the security device 312. If configuration 503 is used, the transmission includes the additional step of transmitting from the security CPU 512 to the co-processor 511. At that point, the process is the same as for configuration 502. If configuration 504 is used, the security CPU 512 transmits directly to the host CPU 113. At that point, the process is the same as for configuration 501.

Referring again to FIG. 9, we continue the process of communicating with the security device 131 from the authorization software. Beginning in step 911, the security device 131 receives the initialization vector 711 and random number 717 from the authorization program 801. Both values are received in the same data packet in the preferred embodiment. Next, in step 913, the initialization vector 711 received from the authorization program 801 is combined with the dynamic key 712 stored within the security device 131 to form keyset 700. Using the process shown in FIG. 7, the security device 131 computes the security key 714 and communications key 716.

Next, in step 914, the security key 714 is scrambled by performing a reversible mathematical or logical operation on the security key 714 using the random number 717 received from authorization program 801. The scrambled security key 714 is then encrypted using the communication key 716 in step 915, creating an encrypted scrambled security key 718. Finally, in step 916, a response containing the encrypted scrambled security key 718 is sent back to the authorization program 801. Because the security key 718 is randomized using the random number 717, the response is different each time, and thus the security device 131 cannot be replaced by a simple circuit that generates the same response each time.

In step 815, the response is received by the authorization program 801. The path of the response from the security device CPU 312 back to the processor running the authorization program 801 is the reverse as described above for the transmitted packet, and depends on the hardware configuration selected.

The next two steps—steps 816 and 817, designated as function 821, takes the response received from the security device 131 to decrypt and unscramble the security key 714. This process begins with step 816, where the communications key 716 embedded in the authorization program 801 is extracted from the authorization program 801 and used to decrypt the response from the security device 131.

The result of the decryption is the scrambled security key. A reversible mathematical operation is performed on the scrambled security key in step 817, using the same random number 717 that was transmitted in step 814. This operation is the reverse of a corresponding reversible mathematical operation performed within the security device 131. In a preferred embodiment, the exclusive OR function is used between the two values. The resulting value from step 817 is a copy of the security key 714.

Finally, in step 818, the security key 714 is used to decrypt the encrypted software 823, making it available for execution on the host processor 113 or the co-processor 511 depending on the hardware configuration used. In the preferred embodiment, the decrypted software is validated by using a checksum or other means well known to one of ordinary skill in the art. This step is desirable to verify a correct decryption step. It is a successful decryption step which in effect validates that the security device 131 and authorization program 801 have access to a common secret, the communications key 716.

According to the present invention, the security key 714 is never stored with the authorization program 801 or with the encrypted software 823. Rather security key 714 is generated dynamically from the security device 131 response, used (in step 818) and discarded. Thus, the security key 714 is not available for discovery by memory dumps or expansion bus transaction analyzers.

An important aspect of the present invention is the use of a hidden key, the dynamic key 712, and a known and not well hidden initialization vector 711 to create a related security key 714 for encryption/decryption of the protected software 215, to randomize the security key 714 with the random number 717, and to communicate the related key by encrypting it using a second related communications key 716. The related keys are generated in such a way that their discovery does not endanger the hidden key.

A system and method for preventing unauthorized use of protected software utilizing a portable security device has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for protecting software from unauthorized use on a computer system using an external security device, the method comprising the steps of:
    (a) encrypting the software to be protected using an encryption key, creating encrypted software, wherein the encryption key is derived from a dynamic key, which is assigned to the software to be protected and does not change between copies of the software;
    (b) in response to the security device being coupled to the computer system, sending information identifying the protected software from the computer system to the security device;
    (c) using information supplied from the software to determine if the dynamic key assigned to the software is present in the security device, and if so, generating the encryption key within the security device using the dynamic key; and
    (d) authorizing use of the software on the computer system by sending the encryption key from the security device to the computer system for decryption of the software.

2. The method of claim 1 wherein step (a) further includes the steps of:
    (i) generating the encryption key using at least the dynamic key and a first piece of information;
    (ii) providing the first piece of information with the encrypted software; and
    (iii) storing the dynamic key in the security device.

3. The method of claim 2 wherein step (b) further includes the steps of:
  (i) sending the first piece of information provided with the encrypted software to the security device, and
  (ii) using the first piece of information and the dynamic key to generate the encryption key in the security device.

4. The method of claim 2 further including the steps of:
  generating a second encryption key using the dynamic key and the first piece of information;
  providing the second encryption key with the encrypted software;
  during software authorization, generating the second encryption key on the security device using the dynamic key and the first piece of information;
  using the second encryption key to encrypt the first encryption key generated on security device prior to transmitting the first encryption key to the computer system; and
  when the encrypted first encryption key is received on the computer system, using the second encryption key provided with the encrypted software to decrypt the first encryption key.

5. The method of claim 2 further including the steps of:
  generating a random number on the computer system;
  transmitting the random number to the security device along with the first piece of information;
  scrambling the encryption key generated by the security device by performing a reversible mathematical operation on the encryption key using the random number;
  encrypting the scrambled encryption key and transmitting the encrypted scrambled encryption key to the computer system; and
  performing a reverse of the reversible mathematical operation performed within the security device using the random number to descramble the encryption key after the encrypted scrambled encryption key is decrypted on the computer system.

6. The method of claim 2 further including the step of: using an initialization vector as the first piece of information.

7. The method of claim 6 further including step of: using a security key as the encryption key and a communications key as the second encryption key.

8. The method of claim 7 further including the step of: embedding a mathematical algorithm within the security device to create the communications key and the security key from the dynamic key and the initialization vector.

9. The method of claim 8 further including the step of: including the encrypted software with an authentication program, wherein the authentication program is embedded within a separate security processor provided in conjunction with the co-processors.

10. The method of claim 9 further including the step of: sharing memory between the security processor and the co-processors and decrypting the encrypted software in the shared memory.

11. The method of claim 10 further including the step of: preventing the software from running in any of the co-processors unless the software has first been decrypted by the security processor.

12. The method of claim 6 wherein the initialization vector is created from a checksum of encrypted software to be protected.

13. The method of claim 6 further including the step of: associating a product ID with the software and transferring the product ID to the security device along with the initialization vector.

14. The method of claim 13 further includes the step of: providing multiple storage locations within the security device to enable storing multiple dynamic keys and corresponding product IDs.

15. The method of claim 14 further includes the step of: using the product ID code to locate and select the appropriate dynamic key within the security device when receiving an authorization request.

16. A method for protecting software from unauthorized use on a computer system, the method comprising the steps of:
  (a) using at least a dynamic key and a first piece of information to generate an encryption key, wherein the dynamic key is assigned to the software to be protected and does not change between copies of the software;
  (b) encrypting the software using the encryption key;
  (c) providing the first piece of information with the encrypted software, wherein at least a portion of the first piece of information identifies the protected software;
  (d) storing the dynamic key in a security device; and
  (e) authorizing use of the software after the encrypted software is loaded on the computer system and the security device is coupled to the computer system by,
    (i) sending the first piece of information provided with the encrypted software to the security device,
    (ii) if the dynamic key assigned to the software is present in the security device, using the first piece of information and the dynamic key to generate the encryption key in the security device,
    (iii) transmitting the encryption key from the security device to the computer system, and
    (iv) decrypting the encrypted software with the encryption key for use on the computer system.

17. The method of claim 16 further including the step of:
  (v) discarding the encryption key after decryption of the encrypted software.

18. The method of claim 17 further including the steps of:
  generating a second encryption key using the dynamic key and the first piece of information;
  providing the second encryption key with the encrypted software;
  during software authorization, generating the second encryption key on the security device using the dynamic key and the first piece of information;
  using the second encryption key to encrypt the first encryption key generated on security device prior to transmitting the first encryption key to the computer system; and
  when the encrypted first encryption key is received on the computer system, using the second encryption key provided with the encrypted software to decrypt the first encryption key.

19. The method of claim 16 further including the steps of:
  generating a random number on the computer system;
  transmitting the random number to the security device along with the first piece of information;
  scrambling the encryption key generated by the security device by performing a reversible mathematical operation on the encryption key using the random number;
  encrypting the scrambled encryption key and transmitting the encrypted scrambled encryption key to the computer system; and
  performing a reverse of the reversible mathematical operation performed within the security device using the random number to descramble the encryption key after the encrypted scrambled encryption key is decrypted on the computer system.

20. The method of claim 16 further including the step of: using an initialization vector and a product ID code as the first piece of information.

21. The method of claim 20 further including steps of: using a security key as the encryption key and a communications key as the second encryption key.

22. A method for protecting software from unauthorized use on a computer system, the method comprising the steps of:
 (a) creating an initialization vector and a dynamic key, wherein the is assigned to the software to be protected and does not change between copies of the software;
 (b) using the initialization vector and the dynamic key to generate a security key;
 (c) using the security key and the initialization vector to generate a communication key;
 (d) encrypting software using the security key to create encrypted software;
 (e) creating a software package comprising the initialization vector, the encrypted software, the communications key, and an authentication program;
 (f) storing the dynamic key in a security device;
 (g) authorizing use of the software after the software package has been loaded on the computer system and the security device coupled to the computer system by
  (i) sending the initialization vector to the security device,
  (ii) in the security device, using the initialization vector and the stored dynamic key to generate the security key and communication key if the dynamic key assigned to the software is present in the security device,
  (iii) encrypting the security key using the communication key,
  (iv) sending the encrypted security key to the computer system as a response,
  (v) using the communications key in the software package to decrypt encrypted security key, and
  (vi) using the security key to decrypt the encrypted software for use on the computer system.

23. The method of claim 22 further including the steps of: generating a random number on the computer system;
transmitting the random number to the security device;
scrambling the security key generated by the security device by performing a reversible mathematical operation on the security key using the random number;
encrypting the scrambled encryption key and transmitting the encrypted scrambled security key to the computer system; and
performing a reverse of the reversible mathematical operation performed within the security device using the random number to descramble the security key after the encrypted scrambled security key is decrypted on the computer system.

24. A computer-readable medium containing program instructions for protecting software from unauthorized use on a computer system using an external security device, the program instructions for:
 (a) encrypting the software to be protected using an encryption key, creating encrypted software, wherein the encryption key is derived from a dynamic key, which is assigned to the software to be protected and does not change between copies of the software;
 (b) in response to the security device being coupled to the computer system, sending information identifying the protected software from the computer system to the security device;
 (c) using information supplied from the software to determine if the dynamic key assigned to the software is present in the security device, and if so, generating the encryption key within the security device using the dynamic key; and
 (d) authorizing use of the software on the computer system by sending the encryption key from the security device to the computer system for decryption of the software.

25. The computer-readable medium of claim 24 wherein instruction (a) further includes the instructions for:
 (i) generating the encryption key using at least the dynamic key and a first piece of information;
 (ii) providing the first piece of information with the encrypted software; and
 (iii) storing the dynamic key in the security device.

26. The computer-readable medium of claim 25 further including the instructions for:
generating a second encryption key using the dynamic key and the first piece of information;
providing the second encryption key with the encrypted software;
during software authorization, generating a second encryption key on the security device using the dynamic key and the first piece of information;
a using the second encryption key to encrypt the first encryption key generated on security device prior to transmitting the first encryption key to the computer system; and
when the encrypted first encryption key is received on the computer system, using the second encryption key provided with the encrypted software to decrypt the first encryption key.

27. The computer-readable medium of claim 25 further including the instructions for:
generating a random number on the computer system;
transmitting the random number to the security device along with the first piece of information;
scrambling the security key generated by the security device by performing a reversible mathematical operation on the encryption key using the random number;
encrypting the scrambled encryption key and transmitting the encrypted scrambled encryption key to the computer system; and
performing a reverse of the reversible mathematical operation performed within the security device using the random number to descramble the encryption key after the encrypted scrambled encryption key is decrypted on the computer system.

28. The computer-readable medium of claim 25 further including the instruction for: using an initialization vector as the first piece of information.

29. The computer-readable medium of claim 28 further including instruction for: using a security key as the encryption key and a communications key as the second encryption key.

30. The computer-readable medium of claim 29 further including the instruction for: embedding a mathematical algorithm within the security device to create the communications key and the security key from the dynamic key and the initialization vector.

31. The computer-readable medium of claim 30 further including the instruction for: including the encrypted software with an authentication program, wherein the authentication program is embedded within a separate security processor provided in conjunction with the co-processors.

32. The computer-readable medium of claim 31 further including the instruction for: sharing memory between the security processor and the co-processors and decrypting the encrypted software in the shared memory.

33. The computer-readable medium of claim 32 further including the instruction for: preventing the software from running in any of the co-processors unless the software has first been decrypted by the security processor.

34. The computer-readable medium of claim 25 wherein the initialization vector is created from a checksum of encrypted software to be protected.

35. The computer-readable medium of claim 28 further including the instruction for: associating a product ID with the software and transferring the product ID to the security device along with the initialization vector.

36. The computer-readable medium of claim 35 further includes the instruction for: providing multiple storage locations within the security device to enable storing multiple dynamic keys and corresponding product IDs.

37. The computer-readable medium of claim 36 further includes the instruction for: using the product ID code to locate and select the appropriate dynamic key within the security device when receiving an authorization request.

38. The computer-readable medium of claim 25 wherein instruction (b) further includes the instructions for:
  (i) sending the first piece of information provided with the encrypted software to the security device, and
  (ii) using the first piece of information and the dynamic key to generate the encryption key in the security device.

39. A computer software authentication system comprising:
  a computer system;
  a software package loaded on the computer system that includes,
    an encrypted software program encrypted with a first encryption key,
    an authorization program,
    a first key of a keyset, and
    a second encryption key; and
  a security device in communication with the computer system that includes a second key of the keyset and mathematical algorithms,
  wherein when the software package is executed the computer system, the encrypted software program is authenticated by,
    transferring the first key of the keyset from the authorization program to the security device,
    generating in the security device the first and second encryption keys using the keyset and the mathematical algorithms,
    encrypting the first encryption key using the second encryption key,
    transferring the encrypted first encryption key from the security device to the computer system,
    decrypting the encrypted first encryption key on the computer system using the second encryption key included in the software package, and
    using the first encryption key to decrypt the encrypted software for execution on the computer system.

40. A method for protecting software from unauthorized use on a computer system as using an external security device, the method comprising the steps of:
  (a) encrypting the software to be protected using an encryption key that is mathematically derived from an dynamic key;
  (b) imbedding in the protected software a communications key that is also derived from an dynamic key;
  (c) authorizing the use of the software, only if the dynamic key is present in the security device, by generating the encryption key from the dynamic key within the security device;
  (d) encrypting the encryption key with the communications key within the security device and sending the encrypted encryption key from the security device to the computer system; and
  (e) with the communications key imbedded in the software, decrypting the encryption key and using the encryption key to decrypt the software.

41. The method of claim 40 wherein step (c) further includes the step of: providing information from the software to the security device and using the information during generation of the encryption key, such that different encryption keys can be derived by having the software provide different information.

42. The method of claim 41 wherein step (c) further includes the step of: transmitting a random number from the software to the external security device for use during encryption of the encryption key so that this result appears random.

* * * * *